United States Patent [19]

Fischer

[11] 4,117,004

[45] Sep. 26, 1978

[54] MANUFACTURE OF AMIDOSULFONIC ACIDS

[75] Inventor: Roman Fischer, Mutterstadt, Fed. Rep. of Germany

[73] Assignee: BASF Aktiengesellschaft, Ludwigshafen am Rhein, Fed. Rep. of Germany

[21] Appl. No.: 822,149

[22] Filed: Aug. 5, 1977

Related U.S. Application Data

[63] Continuation of Ser. No. 570,612, Apr. 23, 1975, abandoned.

[30] Foreign Application Priority Data

May 20, 1974 [DE] Fed. Rep. of Germany ....... 2424371

[51] Int. Cl.$^2$ ............................................. C07C 143/86
[52] U.S. Cl. .................................................. 260/513.6
[58] Field of Search ...................................... 260/513.6

[56] References Cited

U.S. PATENT DOCUMENTS

| | | | |
|---|---|---|---|
| 2,102,350 | 12/1937 | Baumgarten | 260/513.6 |
| 2,191,754 | 2/1940 | Cupery | 260/513.6 |
| 2,390,648 | 12/1945 | Hill et al. | 260/513.6 |
| 3,555,081 | 1/1971 | Zirner et al. | 260/513.6 |

*Primary Examiner*—Joseph E. Evans
*Attorney, Agent, or Firm*—Keil, Thompson & Shurtleff

[57] ABSTRACT

Amidosulfonic acids are manufactured by reacting ureas first with sulfur trioxide and then with sulfuric acid in the presence of organic solvents. The products are sweeteners, in particular cyclohexylamidosulfonic acid and its calcium, sodium and potassium salts, and starting materials for the manufacture of sweeteners, dyes and pesticides.

10 Claims, No Drawings

MANUFACTURE OF AMIDOSULFONIC ACIDS

This is a continuation, of application Ser. No. 570,612 filed Apr. 23, 1975 now abandoned.

The present invention relates to a new process for the manufacture of amidosulfonic acids by reaction of ureas, first with sulfur trioxide and then with sulfuric acid in the presence of organic solvents.

Houben-Weyl, Methoden der Organischen Chemie, Volume 11/2, pages 654 and 655, discloses that N,N'-dialkylureas may be sulfonated by treatment with oleum and then split to give amidosulfonic acids. As is shown for the example of methylsulfamic acid, no sulfonating agents other than oleum, and no organic solvents, are used in the reaction. German Patent No. 636,329 discloses the same reaction and refers to an after-treatment with sulfuric acid or water, without describing these embodiments in more detail. A publication in J. Amer. Chem. Soc., 75 (1953), 1408 also deals with the reaction with oleum, without further after-treatment, described in Houben-Weyl; express attention is drawn to the difficulty of achieving optimum yield from the reaction; and in particular of suppressing or reducing the formation of alkylammonium sulfate. The time at which the starting materials are added, and the temperature control of the reaction, play an important role. In the course of working up, the end product must be washed repeatedly with ether but in spite of these purification treatments it still contains sulfate and can only be purified (further) by dissolving it in methanol and reprecipitating it by addition of substantial amounts of ether.

British Patent No. 1,185,439 draws attention to the disadvantage of using sulfuric acid, even in the form of oleum, since a heavily contaminated end product is obtained, and the removal of the sulfuric acid is involved and difficult. The British patent therefore recommends a method in which substituted urea is reacted with at least twice the equimolar amount of sulfur trioxide in the presence of an organic solvent, and emphasizes that usually from 2 to 4, preferably 3, moles of sulfur trioxide are used per mole of urea. The reaction can also be carried out in two stages, in which case sulfur trioxide must be added to the reaction mixture in each stage. U.S. Pat. No. 3,555,081 describes the same method applied to the synthesis of N-cyclohexylamidosulfonic acid and also shows that the use of sulfuric acid gives impure end products. This patent teaches (column 3, lines 45 to 54) that a decisive factor is that there should be no sulfuric acid in the reaction mixture. If a two-stage method is used, sulfuric acid may only be used together with sulfur trioxide, in the form of oleum, in the second reaction step.

It is an object of the present invention to provide a new process whereby amidosulfonic acids may be manufactured more simply and more economically, in better yield and greater purity.

We have found that amidosulfonic acids of the formula

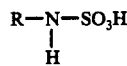
    I wherein R is an aliphatic, cycloaliphatic, araliphatic or aromatic radical, are obtained advantageously by reaction of ureas with sulfur trioxide by a method in which substituted ureas of the formula

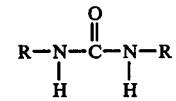
    II wherein R has the above meaning, are reacted, in a first step, with from 1 to 1.9 moles of sulfur trioxide per mole of starting material II in the presence of organic solvents and, in a second step, the resulting reaction mixture is reacted with from 1 to 1.5 moles of sulfuric acid per mole of starting material II.

Where N,N'-dimethylurea is used, the reaction may be represented by the following equations:

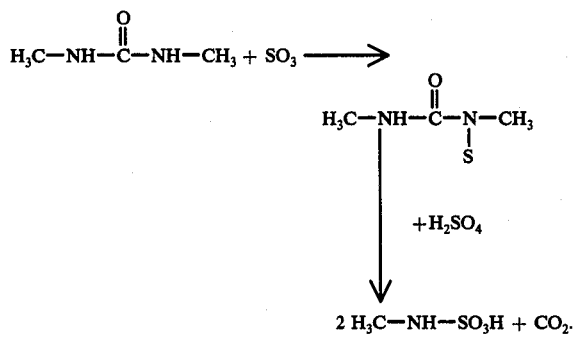

Compared to conventional processes, the process of the invention gives amidosulfonic acids more simply and more economically, and in better yield and greater purity. The process is carried out as a one-pot reaction, in two stages; it is an essential characteristic of the invention that no sulfur trioxide is added in the second stage and that in the first stage smaller amounts (than hitherto) of sulfur trioxide are used. All these advantageous results from the process of the invention are surprising in the light of the state of the art.

Preferred starting materials II and, accordingly, preferred end products I are those wherein R is alkyl of 1 to 12, preferably of 1 to 5, carbon atoms, cyclohexyl, aralkyl of 7 to 12 carbon atoms or phenyl. The above radicals may further be substituted by groups which are inert under the reaction conditions, e.g. alkyl of 1 to 4 carbon atoms.

The following ureas are examples of suitable starting materials II: N,N'-dimethylurea, N,N'-diisopropylurea, N,N'-di-n-butylurea, N,N'-didodecylurea, N,N'-di-sec.-butylurea, N,N'-di-tert.-butylurea, N,N'-diethylurea, N,N'-dicyclohexylurea, N,N'-dibenzylurea, N,N'-diphenylurea, N,N'-di-p-tolylurea, N,N'-di-(p-ethylphenyl)-urea and N,N'-di-(p-xylyl)-urea.

The first step of the reaction is carried out with from 1 to 1.9, preferably from 1 to 1.5 moles of sulfur trioxide per mole of starting material II, and the second step with from 1 to 1.5 preferably from 1 to 1.2, moles of sulfuric acid per mole of starting material II. As a rule, the sulfuric acid is used in the form of 100% strength sulfuric acid (monohydrate); where appropriate, between 96 and 100 percent strength by weight sulfuric acid containing water may also be used. Sulfur trioxide may be used in the solid form or, expediently, in the liquid form or as a gas; it is advantageous to use 100 percent strength sulfur trioxide but where appropriate this may be diluted with an inert gas such as carbon dioxide. However, compounds which release sulfur trioxide under the reaction conditions may also be used, such as addition compounds of sulfur trioxide, e.g. with ethers such as tetrahydrofuran, di-(β-chloroethyl) ether or 1,4-dioxane, with N,N-disubstituted carboxylic acid amides such as N,N-dimethylformamide, or with tertiary amines, e.g. pyridine, triethylamine, trimethylamine, tributylamine, quinoline, quinaldine, dimethylaniline, triphenylamine, N-methylmorpholine, N-ethylmorpholine, N-methylpiperidine, N-ethylimidazole, N-methylethyleneimine, N-ethylpentamethyleneimine, or addition compounds of chlorosulfonic acid with the above amines, especially with pyridine, or appropriate mixtures. Compounds which contain sulfuric acid, e.g. oleum, cannot be used in place of sulfur trioxide. With regard to the definition of 100 percent strength sulfur trioxide, reference should be made to Ullmanns Encyklopadie der technischen Chemie, Volume 15, pages 465 – 467, and with regard to the manufacture of addition compounds to Houben-Weyl (loc.cit.), Volume VI/2, pages 455 – 457 and Volume IX, pages 503 to 508.

The reaction is in general carried out at from $-20°$ C to $+140°$ C, suitably at from $0°$ to $80°$ C, preferably from $15°$ to $60°$ C, in the first step, and suitably at from $+20°$ C to $+140°$ C, preferably from $40°$ to $100°$ C, in the second step, under atmospheric or superatmospheric pressure, continuously or batchwise. In both steps, organic solvents which are inert under the reaction conditions are used; it is advantageous to add the total amount of organic solvent in the first reaction step. Examples of solvents which may be used are aromatic hydrocarbons, e.g. toluene, ethylbenzene, o-, m- and p-xylene, isopropylbenzene and methylnaphthalene, halohydrocarbons, especially chlorohydrocarbons, e.g. tetrachloroethylene, amyl chloride, cyclohexyl chloride, dichloropropane, methylene chloride, dichlorobutane, isopropyl bromide, n-propyl bromide, butyl bromide, chloroform, ethyl iodide, propyl iodide, chloronaphthalene, dichloronaphthalene, carbon tetrachloride, tetrachloroethane, trichloroethane, trichloroethylene, pentachloroethane, trichlorofluoromethane, cis-dichloroethylene, o-, m- and p-difluorobenzene, 1,2-dichloroethane, 1,1-dichloroethane, n-propyl chloride, 1,2-cis-dichloroethylene, n-butyl chloride, 2-, 3- and iso-butyl chloride, chlorobenzene, fluorobenzene, bromobenzene, iodobenzene, o-, p- and m-dichlorobenzene, o-, p- and m-dibromobenzene, o-, m- and p-chlorotoluene, 1,2,4-trichlorobenzene, 1,10-dibromodecane and 1,4-dibromobutane, and appropriate mixtures. The solvent is suitably used in amounts of from 400 to 10,000% by weight, preferably from 400 to 1,000% by weight, based on starting material II.

The reaction may be carried out as follows: a mixture of starting material II, solvent and sulfur trioxide is kept at the reaction temperature for from 0.2 to 6 hours. It is advantageous first to suspend the urea II in a solvent and then to introduce 100 percent strength by weight sulfur trioxide into the mixture whilst stirring well. Sulfuric acid is then added and in the second reaction step the mixture is kept for from 1 to 6 hours at the reaction temperature, which advantageously is higher than that of the first reaction step. The end product is now isolated from the reaction mixture in the usual manner, e.g. by filtration. In an advantageous embodiment, oleum is used, the free sulfur trioxide is expelled therefrom by heating and passed into the first reaction step and the 100 percent strength by weight sulfuric acid which is then left is passed to the second reaction step.

The compounds which may be manufactured by the process of the invention are sweeteners, especially cyclohexylamidosulfonic acid and its calcium, sodium and potassium salts, and valuable starting materials for the manufacture of sweeteners, dyes and pesticides. For example, the corresponding sulfonic acid chlorides, e.g. isopropylaminosulfonyl chloride, may be manufactured from them by chlorination, e.g. with thionyl chloride; the acid chlorides can then be converted, by reaction with anthranilic acid or its salts, to the o-sulfamidobenzoic acids described in German Patent No. 2,104,682. Cyclization of these acids, e.g. by the process described in German DOS 2,105,687 gives 2,1,3-benzothiadiazin-4-one-2,2-dioxides, the use of which as plant protection agents and pharmaceuticals is described in the same patent. With regard to the use of the compounds, reference may be made to the above publications and to German Printed Application No. 1,120,456, German Patent No. 1,242,627 and German Published Application No. 1,542,836.

The parts in the Examples which follow are parts by weight and bear the same relation to parts by volume as that of the kilogram to the liter.

EXAMPLE 1

88 parts of N,N'-dimethylurea are suspended in 250 parts by volume of dichloroethane. 96 parts of gaseous $SO_3$ (100% strength by weight) are passed into the mixture at 25° C. This produces a clear solution. The mixture is then heated to the reflux temperature (from 70° to 75° C) and 98 parts of $H_2SO_4$ (100% by weight) are added. $CO_2$ is evolved and crystals precipitate. After cooling, the mixture is filtered and the residue is rinsed with 250 parts of dichloroethane.

Yield: 222 parts (practically quantitative) of methylamidosulfonic acid of melting point 182.3° C.

EXAMPLE 2

144 parts of N,N'-diisopropylurea are suspended in 250 parts by volume of dichloroethane. 104 parts of $SO_3$ (100% strength by weight) are added at 25° C, in the course of 1 hour. This converts the suspension to a clear solution. When all has been added, the mixture is heated to the reflux temperature (from 70° to 75° C) and 98 parts of 100 percent strength sulfuric acid are then added. $CO_2$ is evolved and isopropylamidosulfonic acid precipitates as crystals. After cooling and filtration, 268 parts (representing virtually quantitative yield) of isopropylamidosulfonic acid of melting point 167° C are obtained.

EXAMPLE 3

224 parts of N,N'-dicyclohexylurea are suspended in 2,000 parts by volume of 1,2-dichloroethane. 104 parts of $SO_3$ (100% strength by weight) are added in the course of 60 minutes, at 50° C. This produces a clear solution, which is heated until it refluxes, and 98 parts of sulfuric acid (100% strength by weight) are then added. $CO_2$ is evolved and cyclohexylamidosulfonic acid precipitates.

Yield: 345 parts (96.4% of theory) of cyclohexylamidosulfonic acid of melting point 168° C.

I claim:

1. A process for the manufacture of an amidosulfonic acid of the formula $$R-N-SO_3H$$
$$|$$
$$H$$

where R is an alkyl of 1 to 12 carbon atoms or cyclohexyl optionally substituted by alkyl of 1 to 4 carbon atoms, which comprises the first step of reacting at −20° C to 140° C an urea of the formula $$\overset{O}{\underset{\|}{R-NH-C-NH-R,}}$$

wherein R has the above meanings, with 1 to 1.9 moles of the compound $SO_3$ per mole of said urea, the reaction in said first step being carried out in a halohydrocarbon solvent which is inert under the reaction conditions, and the second step of reacting the resulting reaction mixture of said first step at 20° C to 140° C with 1 to 1.5 moles of 96 to 100 percent strength sulfuric acid or sulfuric acid monohydrate per mole of said urea to produce said amidosulfonic acid.

2. A process as claimed in claim 1, wherein the compound $SO_3$ is $SO_3$ gas or liquid $SO_3$.

3. A process as claimed in claim 1, wherein said halohydrocarbon solvent is selected from the group consisting of tetrachloroethylene, amyl chloride, cyclohexyl chloride, dichloropropane, methylene chloride, dichlorobutane, isopropyl bromide, n-propyl bromide, butyl bromide, chloroform, ethyl iodide, propyl iodide, chloronaphthalene, dichloronaphthalene, carbon tetrachloride, tetrachloroethane, trichloroethane, trichloroethylene, pentachloroethane, trichlorofluoromethane, cis-dichloroethylene, o-, m- and p-difluorobenzene, 1,2-dichloroethane, 1,1-dichloroethane, n-propyl chloride, 1,2-cis-dichloroethylene, n-butyl chloride, 2-, 3- and iso-butyl chloride chlorobenzene, fluorobenzene, bromobenzene, iodobenzene, o-, p- and m-dichlorobenzene, o- p- and m-dibromobenzene, o-, m- and p-chlorotoluene, 1,2,4-trichlorobenzene, 1,10-dibromodecane and 1,4-dibromobutane, and mixtures thereof.

4. A process as claimed in claim 1, wherein 1 to 1.5 moles of the compound $SO_3$ per mole of said urea are reacted in said first step, and 1 to 1.2 moles of said sulfuric acid per mole of said urea are reacted in the second step.

5. A process as claimed in claim 1, wherein the sulfuric acid used in the second step is 96 to 100% strength by weight sulfuric acid.

6. A process as claimed in claim 1, wherein the reaction temperature in the first step is in the range of 0° to 80° C, and the reaction temperature in the second step is 40° to 100° C.

7. A process as claimed in claim 6, wherein said sulfuric acid is sulfuric acid monohydrate.

8. A process as claimed in claim 1, wherein said halohydrocarbon solvent is dichloroethane.

9. A process as claimed in claim 1 wherein the amount of said halohydrocarbon solvent used in the first step is 400% to 10,000% by weight, based on said urea.

10. A process as claimed in claim 1 for the manufacture of an amidosulfonic acid of the formula $$R - NH - SO_3H$$

where R is alkyl of 1 to 5 carbon atoms by the reaction in a first step at 0° to 80° C of a urea of the formula $$\overset{O}{\underset{\|}{R-NH-C-NH-R}}$$

where R has the above meanings with the compound $SO_3$ in a reaction mixture of 1 to 1.5 moles of $SO_3$ per mol of said urea and a liquid chlorohydrocarbon solvent which is inert relative to $SO_3$ at the reaction temperature, and reacting in a second step at 40° to 100° C the resulting reaction mixture of the first step and 1 to 1.5 mols of 96 to 100% strength sulfuric acid or sulfuric acid monohydrate to produce said amidosulfonic acid in high yield.

* * * * *